A. P. MORROW.
BACK PEDALING COASTER BRAKE.
APPLICATION FILED SEPT. 17, 1906.

911,835.

Patented Feb. 9, 1909.

WITNESSES:
Clarence W. Carroll
Daisy Gurnee

INVENTOR:
Alexander P. Morrow
by Osgood & Davis
his attorneys

UNITED STATES PATENT OFFICE.

ALEXANDER P. MORROW, OF ELMIRA, NEW YORK.

BACK-PEDALING COASTER-BRAKE.

No. 911,835.　　　Specification of Letters Patent.　　　Patented Feb. 9, 1909.

Application filed September 17, 1906. Serial No. 335,039.

*To all whom it may concern:*

Be it known that I, ALEXANDER P. MORROW, a citizen of the United States, and resident of Elmira, in the county of Chemung and State of New York, have invented certain new and useful Improvements in Back-Pedaling Coaster-Brakes, of which the following is a specification.

This invention relates to back pedaling coaster brakes for bicycles and other vehicles, and has for its object to simplify the construction and increase the efficiency of these devices. Its novel features will be disclosed in the course of the specification.

Figure 1:
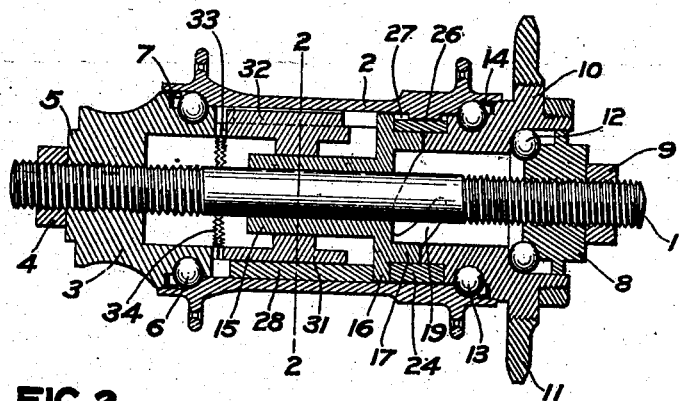
Figure 2:
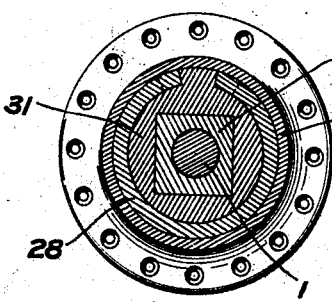
Figure 3:
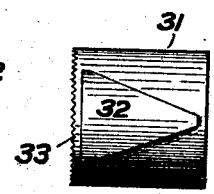
Figure 4:
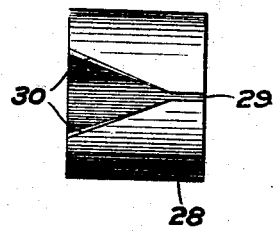
Figure 5:
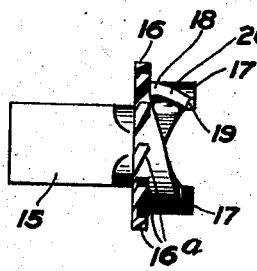
Figure 6:
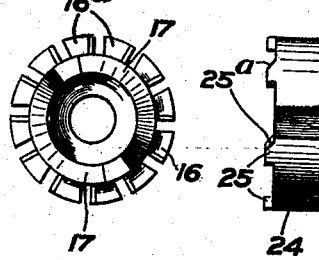
Figures 7, 8:
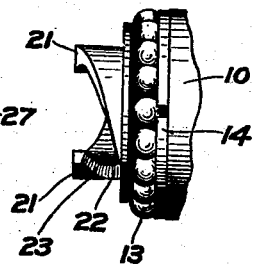

In the drawings:—Figure 1 is a longitudinal vertical section; Fig. 2 is a transverse section on the line 2—2 of Fig. 1; Fig. 3 is an elevation of the brake sleeve; Fig. 4 is a similar view of the brake shoe; Fig. 5 is a side elevation of the clutch sleeve; Fig. 6 is an end view of the same; Fig. 7 is a side elevation of the clutch ring; and Fig. 8 is a partial elevation of the driver.

The device comprises a shaft or axle 1, and an outer sleeve or hub 2, within which are the driving, coasting and braking mechanisms.

A block 3 is held stationary upon one end of the shaft 1 by means of a nut 4, and a squared projection 5 which enters the usual notch in the rear fork of a bicycle frame. Ball bearings 6 are retained in a groove in said block by means of a compressible split ring 7, of L shaped section, of which the inner flange engages the groove, and the outer flange retains the balls.

On the opposite end of the shaft 1 is a cone 8, locked in place by a nut 9. A driving member 10, having the usual sprocket 11 thereon, is partially supported by ball bearings 12. Another set of balls 13 are held in place on the driving member by a retaining ring 14 (see Fig. 8). The hub 2 is carried upon the balls 6 and 13.

Within the hub, and supported upon the shaft 1, is a square sleeve 15, having near one end a series of ratchet teeth 16, projected in a plane transverse to the axis of said sleeve. Two semicircular wedges 17 project from the bases of the ratchet teeth, and in the highest portion of each wedge is cut an acute-angled recess 18 (Fig. 5). The formation of the notches 18 leaves on each wedge a tongue 19, the inner face 20 of which is inclined also. Similar wedges 21 are formed on the inner end of the driver 10, having notches 22 and inclined faces 23 in their high portions.

A ring 24, having projections 25 on one end (Fig. 7) encircles the wedges 21 and 17, in such position that the projections 25 will be engaged by the ratchet teeth 16 when the latter rotate forwardly. On the inside of the hub 2 is a lug 26, which at all times enters a groove 27 in the ring 24.

Upon forward rotation of the driving member 10, the tongues 19 enter the notches 22 in the wedges 21, and the cam action between the faces 20 and 23 causes the sleeve 15 to move to the right (Fig. 1), and become practically locked to the said driving member. In this position the ratchet teeth 16 engage the projections 25 on the ring 24, and the latter, turning with the said sleeve, revolves the hub 2 by reason of its connection with the lug 26. Upon stopping the driving member 10, the hub 2 turns under its momentum, and the ring 24 travels with it, all the other parts remaining stationary. The beveled sides $25^a$ of the projections 25 act as cams upon the beveled sides $16^a$ of the ratchet teeth 16, and the latter are forced to the left, leaving the ring 24 free to revolve with the hub.

The braking device consists of a ring or shoe 28, split at 29, the split being widened to form acutely beveled faces 30. A block 31 is carried by the squared portion of the sleeve 15, and fits snugly within the ring 28. A wedge 32 upon said block is adapted to enter between the beveled faces 30 of the ring, and to expand the latter when forced endwise.

In operating the brake, which is done as usual, by the backward rotation of the crank shaft, the cam action between the semicircular wedge faces 17 and 21 causes the sleeve 15 to move toward the left. The backs of the teeth 16 strike the end of the brake shoe 28, so that it and the block 31 are moved with the sleeve 15. Teeth 33 on said block then engage similar teeth 34 on the block 3, and the brake members are thereby prevented from turning. Further backward rotation of the driving member 10 causes the shoe 28 to be forced still farther to the left, and the wedge 32 expands it against the inner surface of the hub 2, bringing the latter to a stop. Upon rotating the driver 10 forward, the contractile force of the shoe 28 causes it to slide to the right on the wedge 32, and thus release the brake. In this form of back pedaling brake the braking members revolve with the hub during the forward rotation, or driving operation, and are at rest in the coasting position. The only revolving parts while coasting are the hub 2 and the ring 24. This construction permits of very powerful braking action for a small amount of foot-pressure on the pedal, and the brake releases itself without forward pedaling. There are only five working parts with the exception of the hub and cones, and their simple construction permits of ready assembling by inexperienced persons, and minimizes the liability of breakage.

What I claim is:—

1. In a back pedaling brake for cycles, a driving member; a hub; a stationary block, adapted to be attached to the frame of the cycle, and having a brake clutch member; a movable brake shoe; a brake carrier, revoluble with said driving member, having wedge means for actuating said brake shoe supported by said carrier, and adapted to be moved into engagement with said brake clutch; a brake actuator, revoluble with the driving member, and adapted on back pedaling to move said brake carrier into engagement with said brake clutch member, and to actuate said brake shoe by moving it in the same direction with reference to the brake carrier; means for moving said brake actuator in the direction of said brake clutch member on back pedaling; and means for causing driving engagement between said driving member and said hub on forward pedaling.

2. In a back pedaling brake for cycles, a driving member; a hub; a stationary block, adapted to be attached to the frame of the cycle, and having a brake clutch member; a movable brake shoe; a brake actuator revoluble with the driving member, and adapted on back pedaling to move said brake shoe in the direction of said brake clutch member; a brake carrier, revoluble with said brake actuator, having wedge means for actuating said brake shoe, adapted to be moved by engagement with said brake shoe into engagement with said brake clutch member, and to actuate said brake shoe when the latter is moved with reference thereto in the direction of said brake clutch member; cam connections between said brake actuator and said driving member, whereby the former is moved in the direction of said brake clutch member on back pedaling; and means for causing driving engagement between said driving member and said hub on forward pedaling.

3. A driving clutch for free wheel bicycles, comprising a revoluble hub having a clutch member, a sleeve supported upon the axle having a clutch member adapted to engage the clutch member upon the hub and also having on its outer side oppositely directed cam surfaces with a recess between them, and a driving member having on its inner side a curved wedge-shaped hook extending in the direction of rotation for forward driving and engaging an abutment at the end of the recess between the cam surfaces of the said sleeve for driving the hub forward, and adapted also to engage said cam surfaces to shift said sleeve in and out of engagement with the hub.

ALEXANDER P. MORROW.

Witnesses:
 GEO. S. GREENE,
 GEO. H. COUPE.